INVENTOR.
JACK D. CALLAHAN

INVENTOR.
JACK D. CALLAHAN

July 4, 1972 J. D. CALLAHAN 3,674,366
COPY CAMERA
Filed Sept. 4, 1970 5 Sheets-Sheet 3

INVENTOR.
JACK D. CALLAHAN
BY
Morgan, Finnegan, Durham & Pine
ATTORNEYS

INVENTOR.
JACK D. CALLAHAN

BY
Morgan, Finnegan, Durham & Pine
ATTORNEYS

INVENTOR.
JACK D. CALLAHAN

United States Patent Office 3,674,366
Patented July 4, 1972

3,674,366
COPY CAMERA
Jack D. Callahan, 524 Ridgeland Terrace,
Leonia, N.J. 07605
Filed Sept. 4, 1970, Ser. No. 69,583
Int. Cl. G03b 27/40
U.S. Cl. 355—55                    11 Claims

ABSTRACT OF THE DISCLOSURE

A portable copy camera for producing scaled reproductions in any one of a plurality of predetermined proportions. The object to be reproduced and the film are positioned in a fixed constant relationship with respect to each other to define an optical axis. A mechanism is provided for selectively advancing into alignment on the optical axis any one of a plurality of lenses, each lens having a single predetermined location on the axis corresponding to its scale of reproduction. The lenses are designed to provide a uniform effective aperture for constant light transmission when positioned at their respective operative locations.

BACKGROUND AND SUMMARY OF THE INVENTION

The present invention is directed to an apparatus known as a copy camera that is portable in design and capable of producing scaled reproductions in any one of a number of predetermined proportions.

Copy cameras known prior to the present invention are extremely large, expensive and complex pieces of machinery that are nonportable assemblies requiring a dark room for operation and specially trained operators knowledgeable in the field of photography.

The conventional copy camera is characterized by an elongated bed having rails on which a copyboard and lens carriage are movably mounted. The operator of such a camera first physically mounts onto the copyboard the object to be copied. Similarly, appropriate lens adjustments are manually made by the operator corresponding to the desired percentage of enlargement or reduction. The operator then utilizes complex formulae to calculate the precise distances for positioning the copyboard and lens carriage with respect to the film. Finally, the operator physically positions the copyboard and lens carriage at their calculated positions.

As seen from the above, the operation of a conventional copy camera is time consuming and requires a high degree of competence.

As a result, only specialized photographic laboratories having a large volume of copying work are able to justify the use of a conventional copy camera. Smaller and more generalized photographic laboratories as well as businesses that have need for scaled copies do not have the volume of work sufficient to justify the expense incurred in buying and operating their own conventional copy camera, and therefore must utilize the services of a specialized photographic laboratory. In many cases, such a procedure causes delays and increases the expense of obtaining scaled copies.

It is thus an object of this invention to eliminate the shortcomings and disadvantages of the prior art by creating an inexpensive copy camera that can be operated by an unskilled operator.

Another object of this invention is to create a copy camera that is compact and portable.

Another object of this invention is to create a copy camera whose operation is not limited to a conventional dark room.

In accordance with the broad aspects of the invention, a copy camera is created wherein the distance from the object to be photographed and the film is fixed at all times. A plurality of lenses, each specifically designed to provide a particular scale of reproduction, are mounted on a carriage assembly in a fixed predetermined special relationship with respect to one another whereby each lens is accurately positioned onto the optical axis between the object and the film at a predetermined distance therebetween corresponding to its preselected scale of reproduction. In addition, the lenses are designed to provide a uniform effective aperture for constant light transmission when positioned at their operative locations.

In a more specific embodiment, the foregoing is accomplished by utilizing an elevator-turret assembly having a plurality of lenses mounted upon the turret in a fixed spacial relationship. The turret is rotatably mounted upon the elevator platform of the assembly. The assembly is capable of synchronizing the rotational and lateral movement of the turret in response to the rotation of a threaded shaft such that when a particular lens is rotated into position upon the optical axis of the camera, the lens is additionally moved laterally along the optical axis of the camera such that it is positioned at its operative point.

While conventional copy cameras are capable of producing copies in an almost unlimited number of proportions, such a feature is not necessary to perform a large portion of copying work and only adds to the expense, complexity and size of the camera. By creating a copy camera in accordance with the invention that is capable of producing copies in only the more commonly desired proportions, a copy camera is created that is capable of doing a large portion of the copy work which heretofore had to be handled by conventional copy cameras and which is portable, compact, inexpensive, and does not need to be operated within a dark room by highly trained and experienced operators.

BRIEF DESCRIPTION OF THE DRAWINGS

The manner in which the foregoing and other objects are achieved according to the invention is described in the following detailed specification which sets forth an illustrative embodiment. The specification includes the drawings wherein.

DESCRIPTION OF A PREFERRED EMBODIMENT

Figure 1:
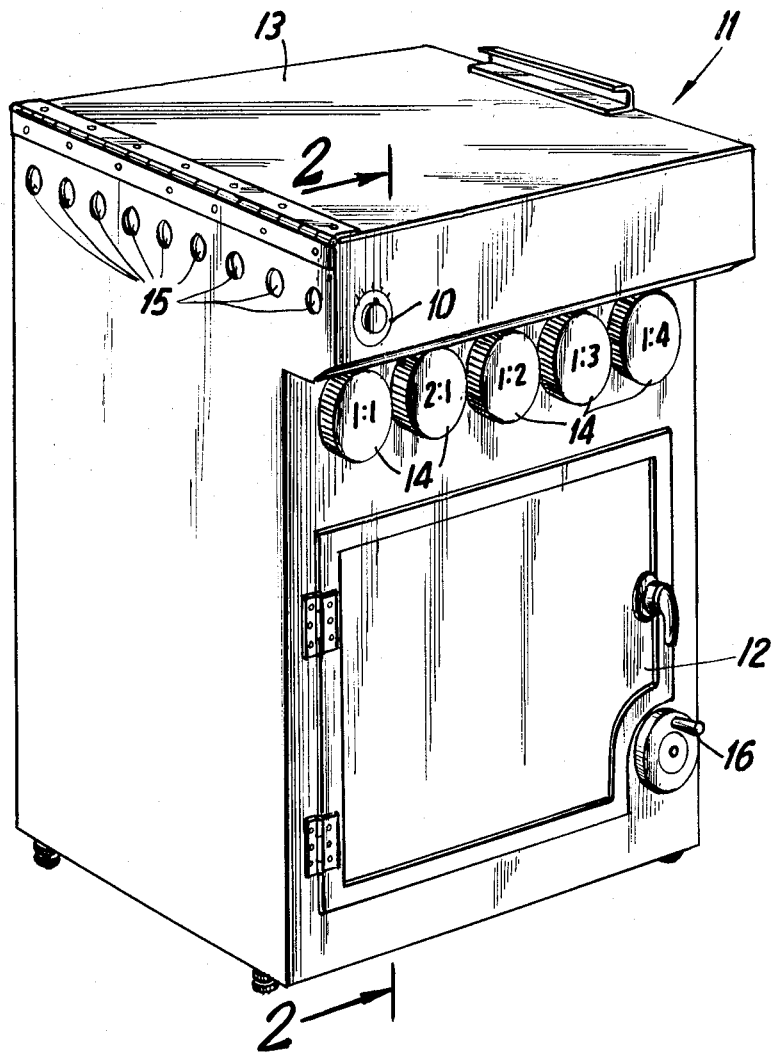
FIG. 1 is a perspective view of a copy camera embodying the present invention.

Referring now more particularly to the embodiment of the invention shown in the accompanying drawings, there is illustrated in FIG. 1 a copy camera in accordance with the invention.

As shown, the copy camera consists of a camera housing 11 having an access door 12 and an access lid 13. The enclosure is designed such that when door 12 and lid 13 are closed, external light is excluded from the interior of the camera. Scale indicators 14 are on the front of the camera and when illuminated, indicate the scale setting of the camera. As illustrated, the scale settings of camera 11 are 1:1, 2:1, 1:2, 1:3 and 1:4. A selector dial 10 is positioned above scale indicator 14 to selectively vary the exposure time for the camera. Ventilation holes 15 are provided in the side walls of the camera housing to provide a means for cooling the illuminating lamps contained within the camera. Operator lever 16 is positioned at the front of the camera and is designed to provide the means by which an operator changes the scale setting of the copy camera. Access door 12 provides access to the camera interior for the insertion and removal of film while access lid 13 provides access to the camera interior for the placement and removal of objects to be copied.

Figure 2:
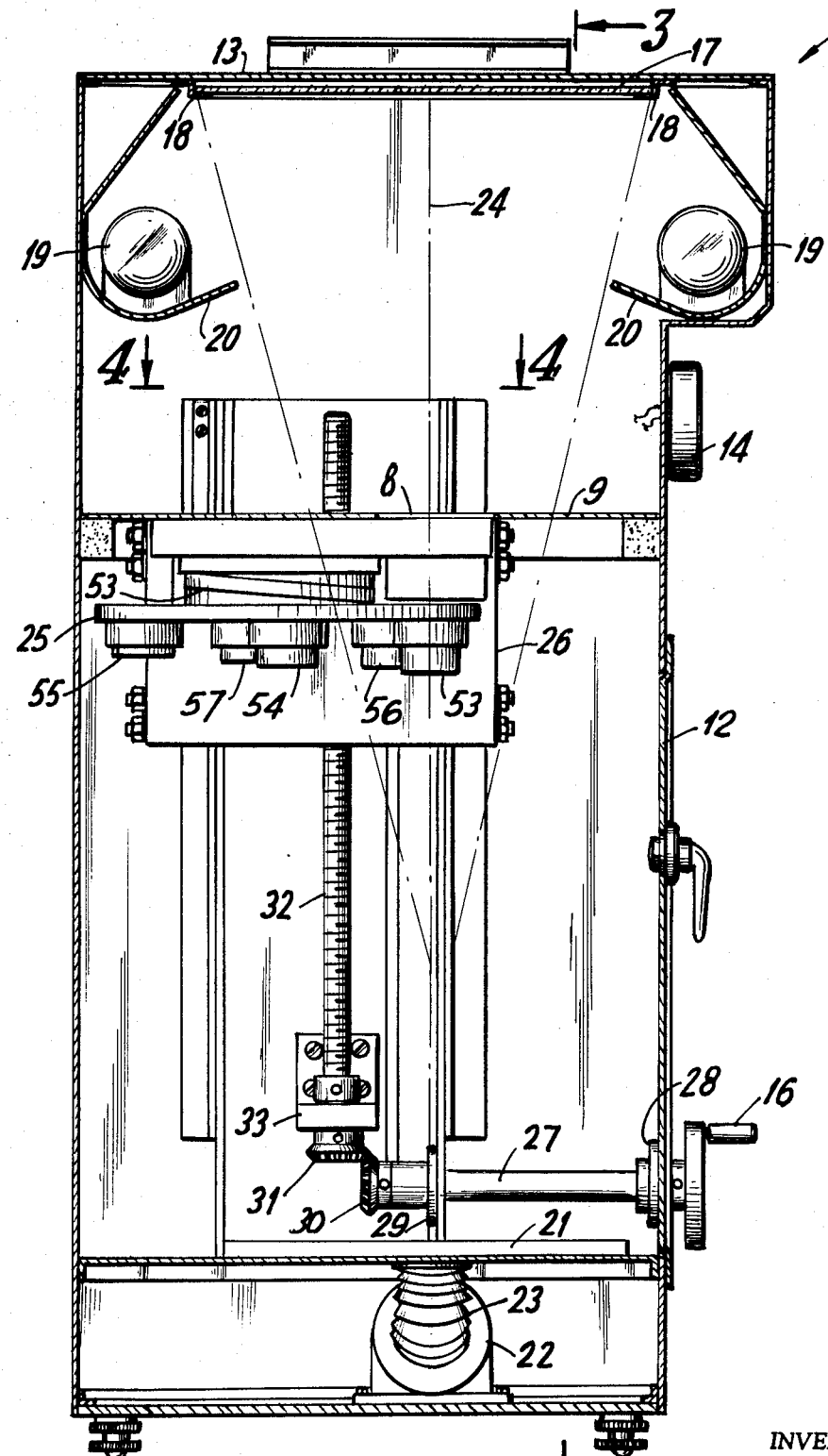
FIG. 2 is a cross-sectional view of the copy camera of FIG. 1 taken along lines 2—2.

FIG. 2 is a longitudinal cross-sectional view of the copy camera of FIG. 1. In accordance with the invention, a mounting surface 17 is positioned beneath lid 13. Mounting surface 17 rests within a supporting channel attached to the housing of the camera and formed by angle members 18. Mounting surface 17 may be made from any one of a variety of transparent materials, as for example glass.

Lamps 19 are mounted upon reflectors 20 which are attached to the camera housing. Lamps 19 illuminate an object placed upon mounting surface 17 whenever current is supplied to the lamps.

Since the design of the present invention eliminates the need for a shutter, the exposure of the film is regulated by the period of time lamps 19 are illuminated.

The period of time current is supplied to lamps 19 is regulated by a conventional timing circuit capable of accurately regulating the period of illumination of the lamps. Such circuits are conventional and well known in the art and are capable of being set by a selector dial 10 (FIG. 1) for one of a variety of time periods so as to enable the camera to selectively illuminate an object for various periods so as to enable the use of a variety of films.

A vacuum platen 21 is centrally mounted within camera housing 11 opposite to mounting surface 17. A vacuum motor 22 is coupled to vacuum platen 21 via flexible housing 23 and provides a suction force for holding film upon the surface of vacuum platen 21. Although sheets of film are anticipated, nothing should be interpreted to so restrict the invention as it is within the scope of the invention to utilize film in forms other than sheets, as for example, rolls, cassettes, etc.

Platen 21 and mounting surface 17 are parallel surfaces aligned with respect to each other to define an optical axis 24 which is perpendicular to both surfaces and centered with respect thereto.

A rotatable turret 25 is mounted upon an elevator-turret assembly 26, the assembly being mounted within the housing of the camera. Turret 25 is caused to rotate while the entire elevator-turret assembly 26 is caused to move parallel to the optical axis upon the rotation of operating lever 16.

The interior of camera housing 11 is divided into two distinct light tight compartments by partition 9. Partition 9 prevents extraneous light originating with lamps 19 from reaching the film. Partition 9 is affixed to elevator-turret assembly 26 and moves in accordance therewith. An opening 8 is formed within partition 9 and aligned on the optical axis of the camera so as to selectively channel through the lenses all light that will strike the film.

Although the specific embodiment of the present invention as characterized above sets forth the utilization of a movable partition as the means for preventing extraneous light from reaching the film, nothing should be interpreted to so limit the invention as it is within the scope of the invention to utilize a stationary partition in conjunction with a flexible bellows in a manner well known within the art to accomplish the above.

Figure 5:
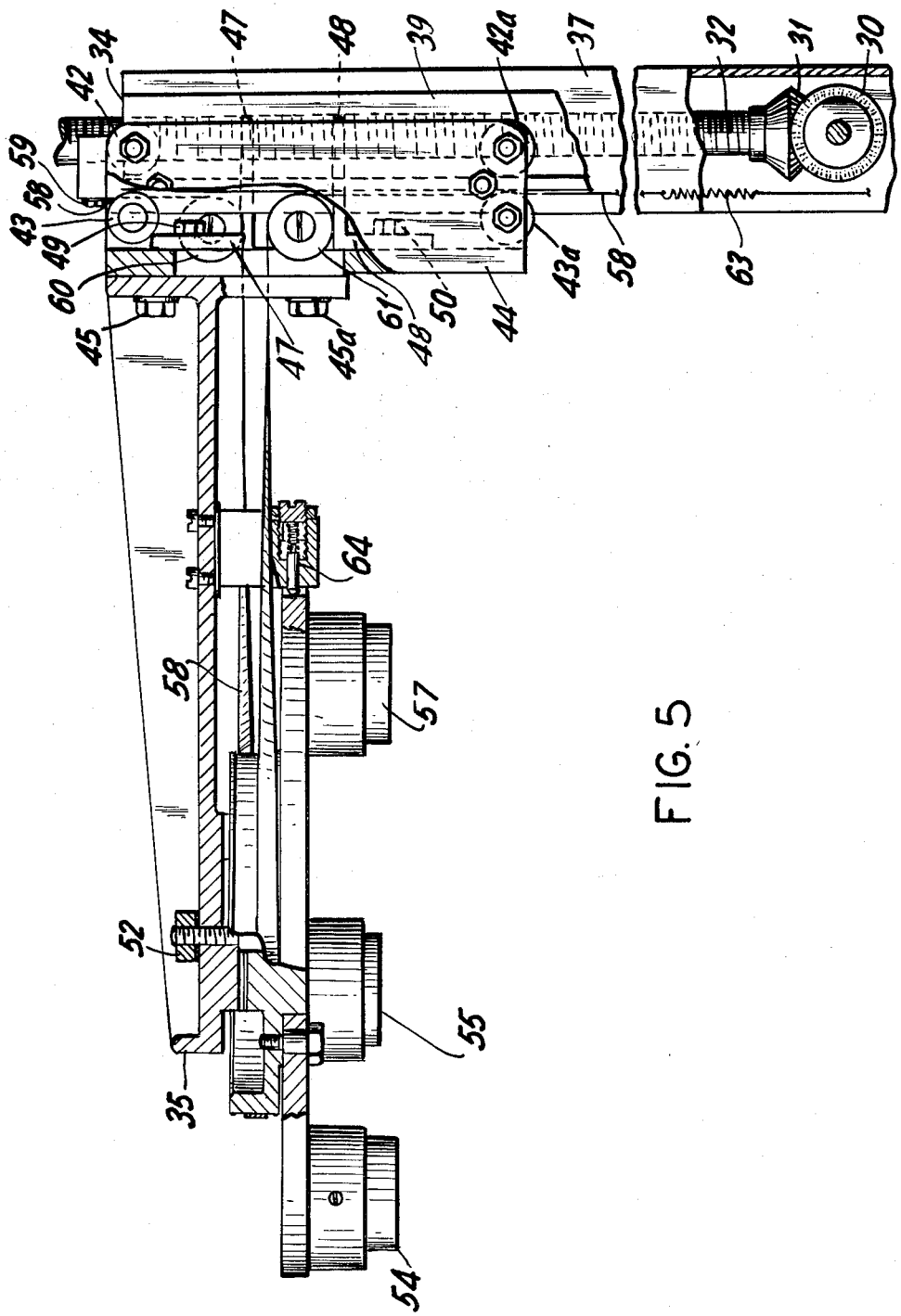
FIG. 5 is a partial sectional view of the copy camera of FIG. 4 taken along lines 5—5.

As will be more fully understood by referring to FIG. 2 in conjunction with FIG. 5, operator lever 16 is axially mounted upon rotatable shaft 27. Shaft 27 via journal mounts 28 and 29 is rotatably mounted within the camera housing. A pair of bevel gears 30 and 31 are axially aligned at right angles to each other and positioned so as to mesh. Bevel gears 30 are mounted upon the end of rotatable shaft 27 while bevel gears 31 are mounted upon the end of threaded rotatable shaft 32. Threaded rotatable shaft 32 is mounted within the camera housing by journal mounts 33 and 34 so as to have its axis parallel to optical axis 24. Thus by rotating operating lever 16, threaded rotatable shaft 32 is caused to rotate.

Figure 3:
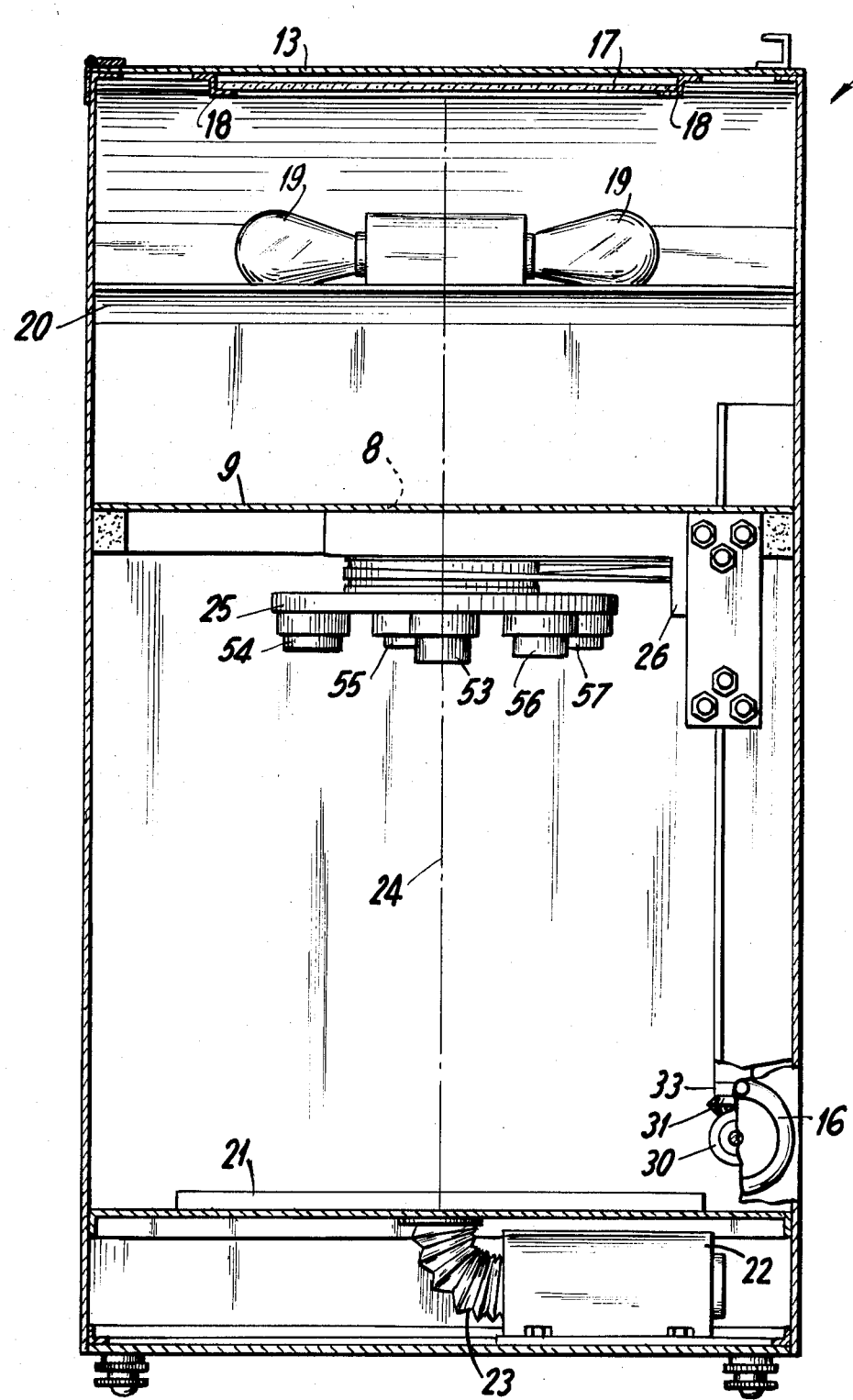
FIG. 3 is a cross-sectional view of the copy camera of FIG. 2 taken along lines 3—3.
Figure 4:
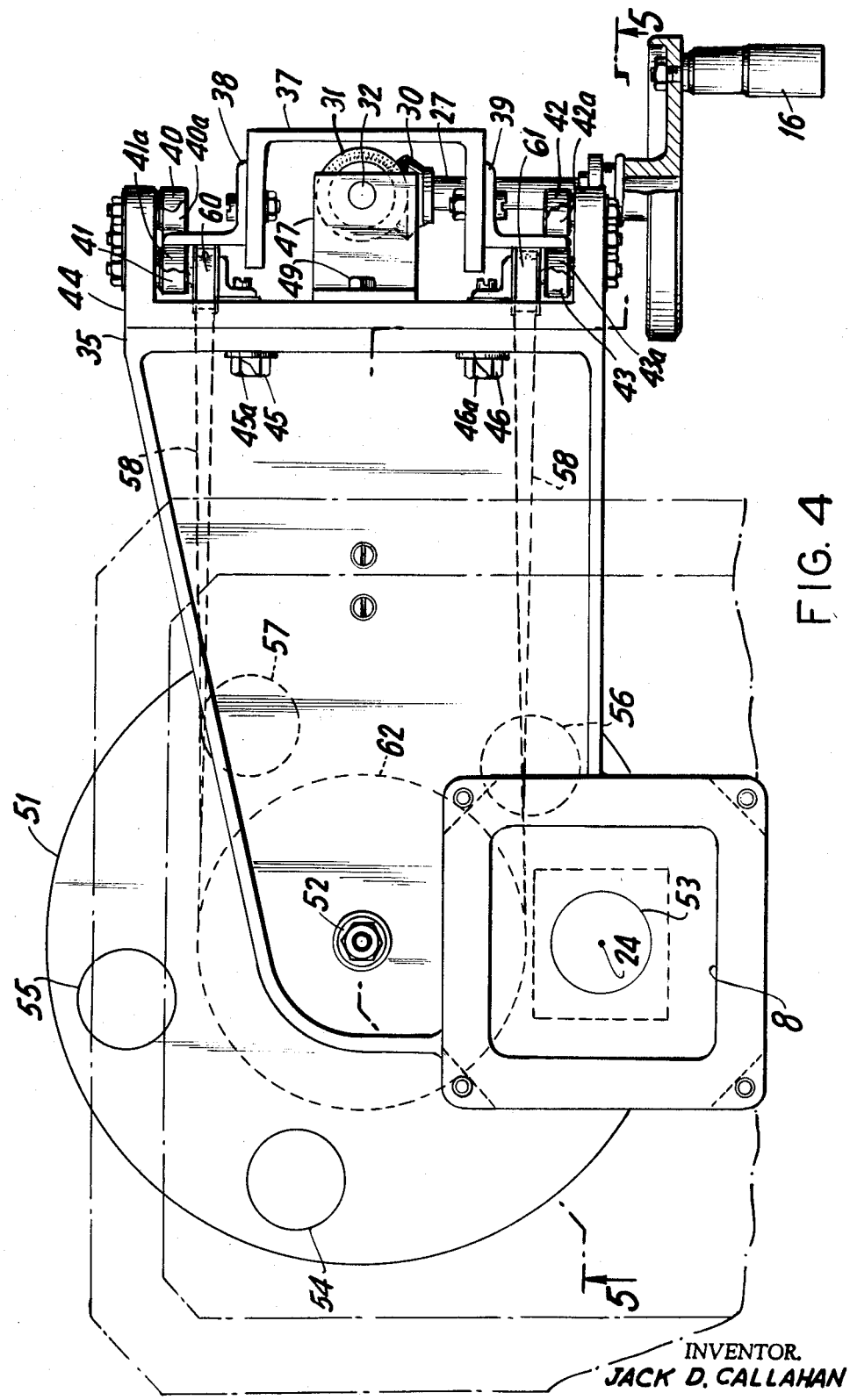
FIG. 4 is a partial sectional view of the copy camera of FIG. 2 taken along lines 4—4.

The elevator platform 35 of elevator-turret assembly 26 is mechanically coupled to threaded rotatable shaft 32 such that rotation of shaft 32 causes the longitudinal movement of elevator platform 35 and thus the entire elevator-turret assembly along the axis of shaft 32. The above can best be understood by referring to FIGS. 3, 4 and 5 wherein there is depicted in detail elevator platform 35 and the mechanical intercoupling between platform 35 and shaft 32.

A frame 37, in the form of a channel, is attached to the base of the camera housing. Frame 37 is parallel to optical axis 24 and extends over the operating length of elevator platform 35. Angles 38 and 39 are affixed to frame 37 and define a pair of operating tracks along which rollers 40, 40a, 41, 41a, 42, 42a, 43 and 43a ride as they guide the movement of elevator-turret assembly 26 along a path parallel to the optical axis of the camera.

Rollers 40, 40a, 41, 41a, 42, 42a, 43 and 43a are rotatably affixed to yoke 44 which is affixed to elevator platform 35 via bolts 45, 45a, 46 and 46a. Angles 47 and 48 are additionally affixed to yoke 44 via bolts 49 and 50 respectively and contain aligned threaded bore holes through which threaded rotatable shaft 32 rotates in meshed alignment.

Upon the actuation of operator level 16, threaded rotatable shaft 32 rotates within the threaded bore holes formed through angles 47 and 48 to cause the angles to thread themselves along threaded rotatable shaft 32, thus causing the entire elevator-turret assembly 26 to move along the optical axis of the camera. Depending upon the direction of rotation of threaded rotatable shaft 32, elevator-turret assembly 26 can be made to move in either direction along the optical axis of the camera.

Turret 51 is rotatably mounted via bolt 52 to elevator platform 35. Turret 51 provides a rotatable base upon which optical lenses 53, 54, 55, 56 and 57 are mounted. The lenses are centered an equal distance from the center of rotation of the turret with the turret positioned with respect to the optical axis of the camera such that each lens is capable of being rotated into alignment onto the optical axis of the camera.

In accordance with the invention, the rotational movement of turret 51 is correlated with the longitudinal movement of elevator platform 35 such that the proper lens for a particular scale of reproduction is rotated onto optical axis 24 at its appropriate position along the axis. The above is accomplished in the following manner.

A spring biased belt 58 is anchored to angle 38 by retaining bolts 59 (FIG. 5). Belt 58 is threaded under roller 60, twisted 90° and passed around shaft 62 of turret 51, twisted back 90° and passed over roller 60 and then attached to one end of biasing spring 63, the other end of the spring being anchored to the base of the camera. Spring 63 is utilized as a biasing force to permit a slight slackening of the tension supplied by belt 58 when operator lever 16 is initially actuated. In this manner, the operation of lever 16 is eased.

Rollers 60 and 61 are rotatably affixed to elevator-turret assembly 26 and move with the assembly in response to the rotational movement of threaded rotatable shaft 32.

When threaded rotatable shaft 32 causes elevator-turret assembly 26 to move, as for instance in a direction towards bevel gears 30 and 31 (FIG. 5), portions of belt 58 in effect move across the surfaces of rollers 60 and 61 and shaft 62. Since rollers 60 and 61 and shaft 62 are rotatably mounted upon elevator-turret assembly 26 as well as being frictionally aligned with belt 58, rollers 60 and 61 and shaft 62 rotate about their axes whenever elevator-turret assembly 26 is moved along the optical axis. In this manner, turret 51 is rotated in direct relationship to the movement of elevator-turret assembly 26 along the optical axis of the camera.

In keeping with the invention, the pitch of threaded rotatable shaft 32 and the diameter of shaft 62 are interrelated such that elevator platform 35 and thus turret 51 travel the complete operaive length along the optical axis of the camera within one complete rotation of turret 51. As a result, a fool-proof method of operation that eliminates the need for mathematical calculations and skilled operators is achieved since lenses designed for a particular scale of reproduction are factory positioned upon the turret of the camera at points that rotate onto the optical axis of the camera when the turret is positioned along said axis at the operative position for the lens.

To assure the proper alignment of a lens onto the optical axis at its operative position, a spring loaded detent 64 (FIG. 5) is attached to elevator platform 35 and aligned with mating holes formed within turret 51 at points corresponding to the proper alignment of a particular lens onto the optical axis of the camera. The detent is biased such that it will lock the rotation of turret 51 in selected positions, but can be unlocked to permit the turret to rotate if sufficient pressure is applied by the operator to operator lever 16.

As stated previously, scale indicators 14 are selectively illuminated to indicate the particular scale of reproduction for which the camera has been set. The above can be accomplished by any one of a variety of well known methods, as for example, by having detent 64 actuate a microswitch associated with a particular scale indicator 14 whenever the detent contacts the appropriate mating hole.

In actual operation, an object to be copied is placed face down upon mounting surface 17. Film is then placed upon vacuum platen 21 and access door 12 and access lid 13 are closed. Operator lever 16 is then rotated to select the proper scale of reproduction, said scale being visually indicated by the illumination of the appropriate scale indicator 14. Selector dial 10 is then set for the appropriate exposure time and actuated to set the timing circuit into operation. After lamps 19 have been illuminated in response to the timing circuit, the exposed film is then removed from the camera for development.

In the context of the above, it can be seen that by predetermining the dimensions that a print should have as well as predetermining its scale of reproduction with respect to the original, by fabricating lenses that will produce such prints when positioned at a predetermined point along an optical axis of fixed length, by positioning each lens upon the turret of an elevator-turret assembly so that a lens is rotated onto the optical axis of the camera at its operative position for a particular scale of reproduction and by predesigning each lens of the camera so that when operatively positioned along the optical axis each lens provides a uniform effective aperture for constant light transmission, a copy camera which is portable, compact, inexpensive and which does not need to be operated within a dark room by highly trained and experienced operators is created that is capable of producing scaled prints in any one of a number of predetermined proportions.

The preceding description and accompanying drawings relate primarily to a copy camera; however, the invention in its broader aspects is not limited to the specific embodiment herein shown and described, but departures may be made therefrom within the scope of the accompanying claims without departing from the principles of the invention and without sacrificing its chief advantages.

I claim:

1. A copy camera for reproducing on photosensitive film a scaled reproduction of an object, said copy camera comprising:
   (a) a copy mounting surface for operatively positioning the object to be copied;
   (b) a film platen adapted to hold said photosensitive film, said copy surface and said film platen being in fixed parallel relationship to one another and defining a reference optical axis extending orthogonally therebetween;
   (c) a plurality of lenses formed to provide a plurality of selected scales of reproduction, each of said lenses having a predetermined operative position on said reference axis;
   (d) lens alignment means axially movable along said reference axis between said copy surface and said film platen and having said lenses mounted thereon in fixed spatial relationship to one another corresponding to their said relative operative positions on said reference axis, said lens alignment means including advancement means for simultaneously and coordinately axially moving said lens alignment means along said reference axis and selectively advancing said lenses into operative alignment with said reference axis at their respective operative positions on said axis;
   (e) a light source disposed to illuminate said copy surface; and
   (f) exposure control means for regulating the time interval during which said object station is illuminated by said light source.

2. A copy camera as described in claim 1 wherein said lenses are formed to provide a uniform effective aperture for constant light transmission when operatively positioned on said reference optical axis.

3. A copy camera as described in claim 1 additionally comprising indicating means for visually indicating the scale setting of the camera.

4. A copy camera as described in claim 1 wherein said exposure control means comprises a timer means for energizing said light source for selected periods of time.

5. A copy camera as described in claim 1 wherein said lens alignment means comprises a rotatable turret, said plurality of lenses being mounted thereon equidistantly from the rotational center thereof and in circumferentially spaced relation correlating to their relative operative spaced relationship on said reference optical axis.

6. A copy camera as described in claim 5 wherein said lens alignment means additionally comprises a threaded shaft mounted parallel to said reference optical axis and a nonrotatable carriage means operatively mounted thereon, said rotatable turret being operatively mounted on said nonrotatable carriage means so that rotation of said threaded shaft causes said nonrotatable carriage means to thread itself along said threaded shaft to thus position each of said plurality of lenses on said reference optical axis at their respective operative positions.

7. A copy camera as described in claim 6 additionally comprising means for directly coordinating the rotational movement of said turret with its axial movement along said shaft so that a preselected lens is rotated onto said reference optical axis at is operative position along said axis.

8. A copy camera as described in claim 7 wherein said coordinating means comprises a belt and pulley means, said belt being secured at both ends and mounted in frictional tension with said turret and pulleys such that the threading of said nonrotatable carriage means along said shaft correspondingly results in movement of said belt with respect to said turret and said pulleys to cause rotational movement thereof.

9. A copy camera as described in claim 7 wherein said turret rotates one complete rotation over the operative length of said lens alignment means.

10. A copy camera as defined in claim 1 additionally comprising detent means for securing any selected one of said plurality of lenses accurately on said reference optical axis.

11. A copy camera as described in claim 1 wherein said lens alignment means is manually actuated.

References Cited

UNITED STATES PATENTS 3,169,441  2/1965  Johnson ---------- 355—63 X
3,292,485  12/1966  Mey -------------- 355—56 X SAMUEL S. MATTHEWS, Primary Examiner R. A. WINTERCORN, Assistant Examiner U.S. Cl. X.R.
355—56, 61, 63